United States Patent [19]

Blevins et al.

[11] 4,327,885

[45] May 4, 1982

[54] THRUST AUGMENTED ROCKET

[75] Inventors: Ralph W. Blevins, Columbia; James L. Keirsey, Rockville; William B. Shippen, Brookeville, all of Md.

[73] Assignee: The United States of America as represented by the Secretary of the Navy, Washington, D.C.

[21] Appl. No.: 187,136

[22] Filed: Oct. 6, 1971

[51] Int. Cl.³ .............................................. F42B 15/16
[52] U.S. Cl. ................................ 244/3.24; 60/270 S; 137/15.1
[58] Field of Search ................ 137/15.1, 15.2; 60/225, 60/270 S; 244/3.21, 3.24, 53 B

[56] References Cited

U.S. PATENT DOCUMENTS

| | | | |
|---|---|---|---|
| 2,898,856 | 8/1959 | Lightbody et al. | 244/3.24 |
| 2,926,613 | 3/1960 | Fox | 60/270 S |
| 2,931,167 | 4/1960 | Leduc | 137/15.1 |
| 3,011,307 | 12/1961 | Edelfelt | 137/15.1 |
| 3,016,827 | 1/1962 | Boyd | 244/324 |
| 3,057,581 | 10/1962 | Tumavicus | 244/3.22 |
| 3,066,892 | 12/1962 | Smith et al. | 244/53 |
| 3,188,958 | 6/1965 | Burk et al. | 244/3.21 |
| 3,279,187 | 10/1966 | Lindman | 60/270 |
| 3,535,881 | 10/1970 | Schubert | 60/270 S |
| 3,635,030 | 1/1972 | Schubert et al. | 60/270 S |

*Primary Examiner*—Stephen C. Bentley
*Attorney, Agent, or Firm*—R. S. Sciascia; A. L. Branning

[57] ABSTRACT

Invention is an aerial vehicle that uses a centrally located aft burning solid-propellant motor to supply a fuel-rich exhaust to four cylindrical engines which are mounted in equally spaced relation about the exterior of the vehicle body. The fuel-rich exhaust is mixed with air in the engines and burned to provide ramjet action to propel the vehicle. A tandem booster rocket initially propels the vehicle to supersonic speed. Tail fins are interdigitated with respect to the engines and include sections which are movable upon command for steering the vehicle. Among the advantages for the vehicle are its maneuverability and its adaptability to existing missile systems.

15 Claims, 16 Drawing Figures

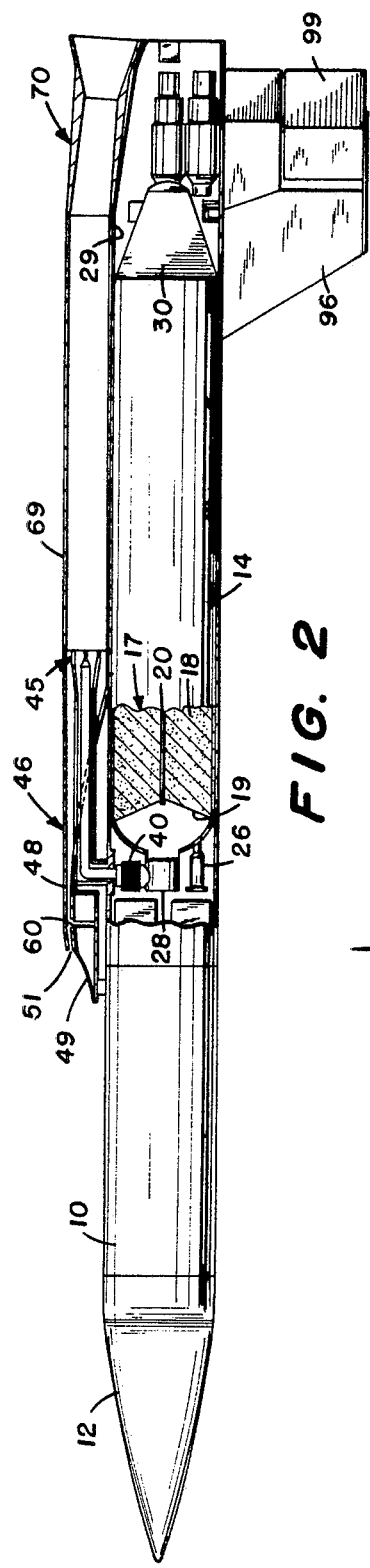
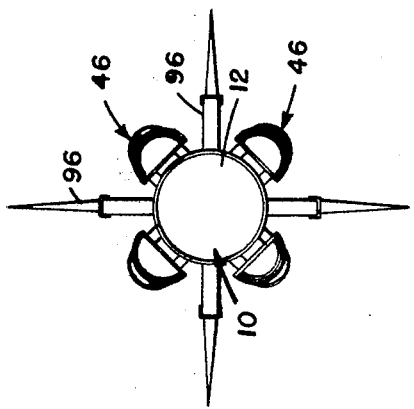
FIG. 2
FIG. 3

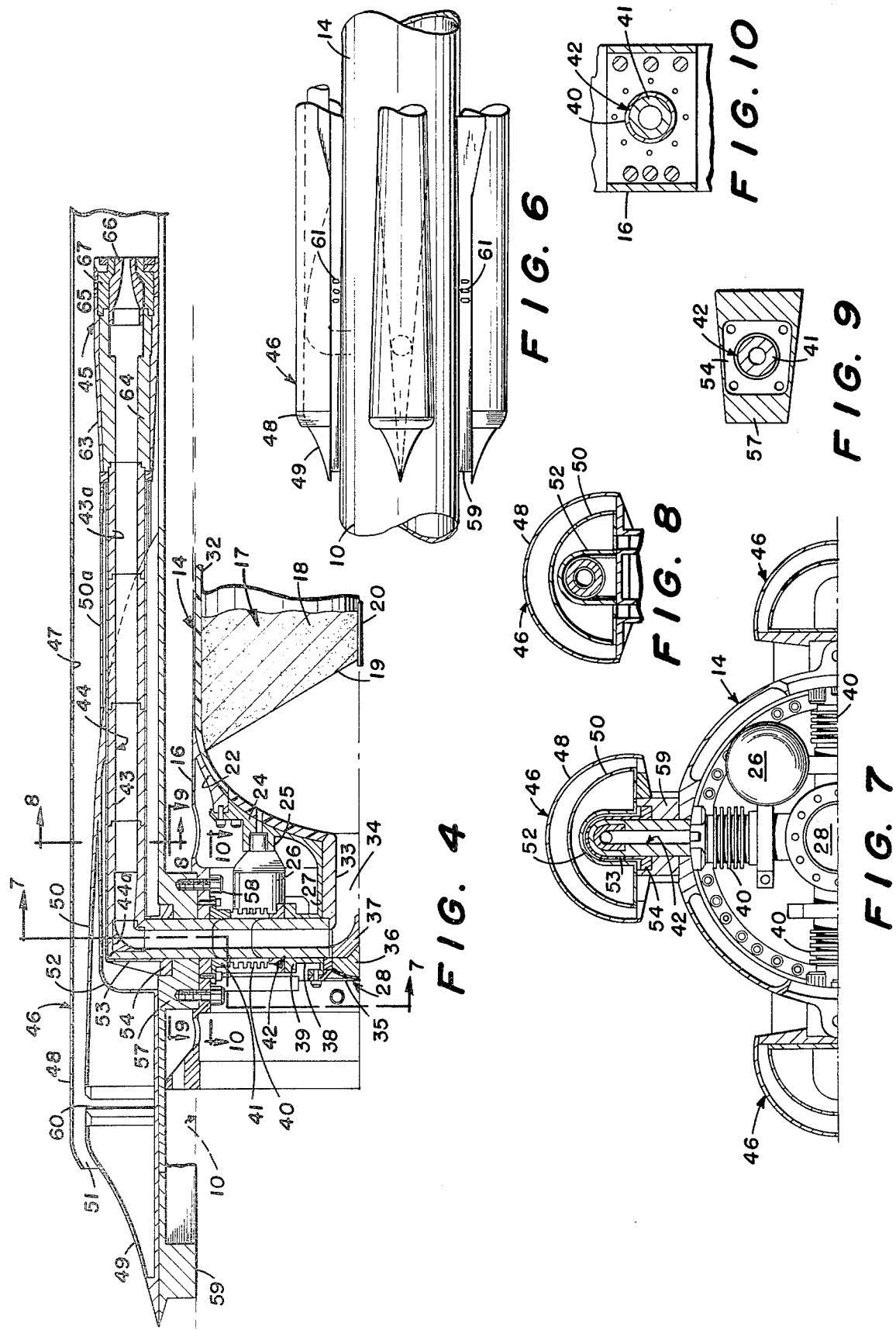

THRUST AUGMENTED ROCKET

BRIEF SUMMARY OF THE INVENTION

This invention relates generally to aerial vehicles and more particularly to an aerial vehicle which utilizes a plurality of ramjet engines supplied by a flow of fuel-rich propellant from a single solid propellant motor.

A particularly important object of the invention is to provide a vehicle having an engine-fuel source configuration which is well suited for use with missiles which are volume limited and that are required to change direction rapidly to intercept maneuvering airborne targets.

Another object of the invention resides in the provision of an aerial vehicle having an engine-fuel source combination that will be compatible with existing or planned missile front-end subsystems.

A front and more specific object of the invention is to provide an aerial vehicle having four separate cylindrical engines spaced about its body and supplied with a fuel-rich propellant which is supplied by the exhaust from a single, centrally located, aft-burning motor, and four insertable tail surfaces interdigitated with the engines, the use of four separate engines avoiding the problems of interactions among the engine inlets at changing angles of attack.

Still another object is to provide an aerial vehicle having a unique tail fin structure.

Another object of the invention is to provide an aerial vehicle which will be compatible with existing launching systems.

Another object of the invention is to provide an aerial vehicle which will require no in-service maintenance.

A further object of the invention is to provide an aerial vehicle wherein the primary propellant insures continuous afterburner combustion, with the result that flameout, long a problem with ramjets, will be avoided.

A further object of the invention is to provide an aerial vehicle wherein the stream of fuel-rich propellant itself provides a significant thrust contribution at high altitudes, with the result that propulsion operability at such high altitudes will be possible, and with engine operation relatively insensitive to inlet airflow instability, so far as maintenance of combustion is concerned.

And as a further object, the invention provides an aerial vehicle wherein the fuel employed is constituted by a safe, relatively insensitive, fuel-rich propellant.

Additional objects of the invention will appear in the course of the following description.

BRIEF DESCRIPTION OF THE DRAWINGS

FIG. 2 is a longitudinal section, partly in elevation, of the vehicle;

FIG. 3 is a front elevation of the vehicle;

FIG. 4 is a detail section showing portions of the forward end of the fuel motor and the manifold, and showing the structure of one of the ramjet engine inlet diffusers and one of the discharge tubes employed;

FIG. 6 is a detail plan view showing portions of three of the ramjet engines mounted on the missile body;

FIG. 7 is a detail transverse section on the line 7—7 of FIG. 4;

FIG. 8 is a detail section through one of the ramjet engines, on the line 8—8 of FIG. 4;

FIG. 9 is a detail section on the line 9—9 of FIG. 4;

FIG. 10 is a detail section on the line 10—10 of FIG. 4;

DETAILED DESCRIPTION OF THE INVENTION

Figure 1:
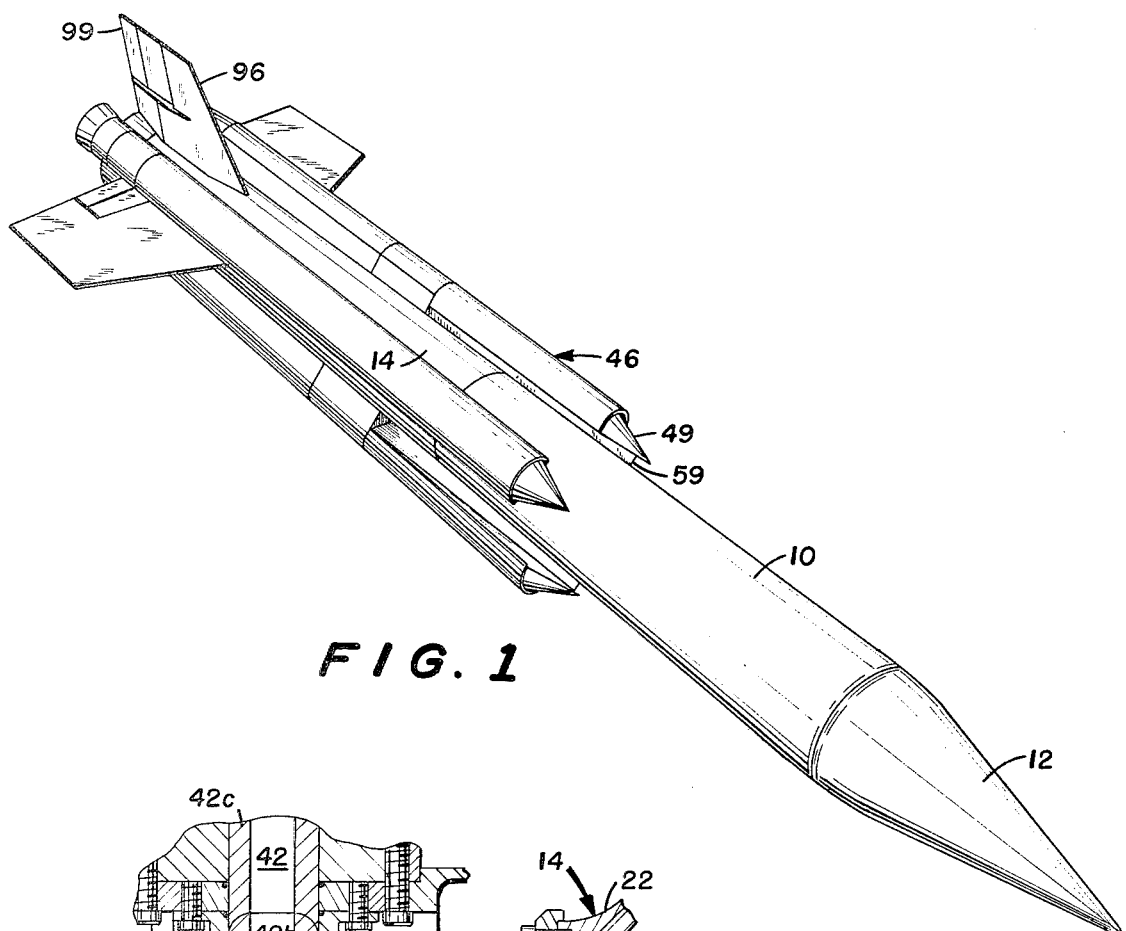
FIG. 1 is a perspective view of the vehicle constituting the present invention.

The vehicle constituting the present invention employs a single centrally located aft burning solid propellant motor mounted within a body to provide a fuel-rich exhaust to four cylindrical ramjet engines mounted on the exterior of the body equidistant from each other. The vehicle includes four insertable tail surfaces which are interdigitated with the engines, and is accelerated to a speed of the order of Mach 3 by a tandem booster rocket. The vehicle configuration shown in perspective in FIG. 1 is well suited to missiles which must maneuver rapidly to intercept maneuvering airborne targets, are volume limited, and must have commonality with existing or planned front end subsystems.

The configuration employed is compatible with existing guided missile launching systems, which will accept a missile having a tandem booster and the aforementioned ramjet engines that are spaced about the body of the missile. The configuration is capable of demonstrating the critical propulsion features of an extended range thrust augmented rocket surface-to-air missile.

The fuel-rich exhaust from the solid propellant motor is discharged forward through a manifold into four discharge tubes which carry the fuel to four combustion chambers, or afterburners, which are located downstream from air inlets and diffusers. The fuel-rich exhaust is mixed with air entering the combustion chambers from the diffusers, burned, and discharged through nozzles to develop thrust.

Referring now to the drawings in detail, the vehicle, or missile, comprises a forward body section 10 which is cylindrical and includes an ogive nose 12. The body may conveniently be divided into compartments containing guidance equipment, ordnance (fuse and warhead), an autopilot, the main electrical batteries, and transducers for measuring the ram pressure and determining angle of attack by sensing differential pressure. Other equipment, such as flight safety devices, a telemetry system and a self-destruct charge, may also be included.

Attached to the aft end of the body section 10 and cooperating with said body section and an aft section, to be described hereinafter, to form the basic frame for the vehicle, is a propellant case 14. As best seen in FIG. 4, case 14 is connected to the body section 10 by a forward skirt 16 and contains a solid propellant motor 17 having a propellant grain 18 with a conical burning surface 19 and an axially located longitudinally extending aluminum wire 20. The propellant grain 18, in one planned embodiment, is composed of 50% boron, 4% aluminum, 25% ammonium perchlorate, 15% binder and 6% nBF additive. The propellant grain surface is conical to accommodate the burn rate characteristics of the wire 20. Burning of the grain 18 produces a fuel-rich exhaust which is discharged at sonic velocities into the combustors of the four ramjet engines that are mounted on the exterior of the case 14, as will be described hereinafter.

As will be seen in FIG. 4, the forward skirt 16 is formed integral with an arcuate wall portion 22 which forms a part of the closure for the forward end of the propellant case 14, the remaining part of the closure being constituted by a dome section 24 which has a threaded boss 25, to receive an igniter 26, and an axial inlet pipe 27 which forms a part of a manifold 28. The propellant case 14 includes, in addition to the skirt 16, the dome section 24 and the cylindrical section that contains the grain 18, an aft skirt 29 (FIGS. 2 and 15) and a conical aft end section 30.

Disposed between the grain 18 and the propellant case 14 is a liner 32 of suitable heat insulating material such as silica phenolic. This liner and a layer of insulation (not shown) sprayed on the exterior of said propellant case serve to protect the grain from excessive temperatures from aeroheating. A liner sleeve 33, also of insulating material, is mounted in the inlet pipe 27 and protects said pipe from damage from the fuel-rich exhaust produced by the burning grain. As will be seen, the sleeve 33 extends from the forward end of the liner 32 through the manifold 28.

Figure 5:
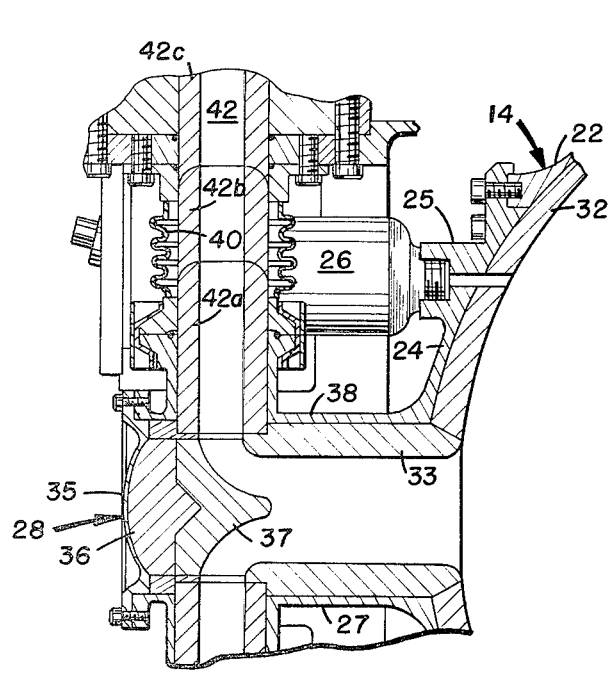
FIG. 5 is an enlarged detail section showing the manifold structure.

The manifold 28 includes, in addition to the inlet pipe 27, a central chamber 34 which is closed at its forward end by a cap 35. Within the chamber 34, adjacent the cap is mounted an insulator disk 36 and positioned on the disk is a flow diverter 37. To conduct the fuel-rich exhaust from the chamber 34 the manifold is provided with four outlet pipes 38 which are spaced 90 degrees apart and include flanges 39 at their outer ends for connection to mating flanges on bellows 40, the opposite ends of the bellows having flanges 41 connected to the forward end of the skirt 16. Positioned within the bellows 40 and the outlet pipes 38 and communicating with the central chamber 34 through an opening in the sleeve 33 is the radial section 42 of a discharge tube 44 which forms a part of one of the four ramjet engines now to be described. As best seen in FIG. 5 the radial section 42 is comprised of separate inner, central and outer portions 42a, 42b and 42c, respectively, to allow for thermal expansion, the portion 42c being connected at its outer end to the forward end of the longitudinal section 43 of the discharge tube. At its aft end the longitudinal section 43 communicates with a discharge nozzle 45. At the junction of the radial and longitudinal discharge tube sections, which meet at 90 degrees, is an elbow 44a of molybdenum.

The four ramjet engines are mounted on the propellant case 14 symmetrically about its exterior. The four engines are identical, so that a description of one will suffice for all of them. Referring particularly to FIGS. 2 and 4, a typical ramjet engine according to the invention is shown generally at 46. Basically, each engine includes a semicylindrical nacelle having an air induction system, a combustor, or afterburner, and an exhaust nozzle assembly. The longitudinal section of the discharge tube from the motor 17 is mounted within the inlet nacelle.

In more detail, the air induction system comprises an inlet section 47 having an outer shell 48, a spike section 49, and an innerbody 50 defining a diffuser, the outer shell and spike section defining a throat 51. The innerbody 50 includes a housing 52 which receives the discharge tube 44 therein. As best seen in FIG. 4, the housing extends through the innerbody wall and has its aft end connected to the discharge nozzle 45. Also as shown in FIG. 4, the housing includes a tubular section 53 which terminates in a mounting flange 54 that is secured in a recess on a floor plate 57.

The engine 46 extends forwardly to extend along the aft end portion of the body section 10 in spaced relation thereto and is connected to the propellant case 14 by bolts 58 which extend through the forward end portion of the skirt 16 and into the floor plate 57. Positioned between the frame of the vehicle, defined by the body section 10, the propellant case and the aft end section, is a diverter wedge 59, which will be discussed in more detail hereinafter.

To remove excess airflow at high alpha conditions and to remove an internal boundary layer an internal bleed arrangement is provided. This internal bleed is effected by a semicircular slot 60 between the aft end of the spike section 49 and the forward end of the innerbody 50. As will be seen in FIG. 4, the margins of the section 49 and the innerbody 50 that define the slot 60 are thickened and the walls of the slot are forwardly inclined to proportion properly the relative quantities of air bled under local supersonic conditions to those bled at local subsonic flow. Bleed flow passes into a plenum region in the innerbody from which it is directed aft to exhaust through a series of louvers 61 (FIG. 6) in the diverter wedge.

The nozzle assembly 45 comprises a slightly flared outer sleeve 63 which has its forward end connected to the aft end of an extension 50a of the innerbody 50, which said extension surrounds the aft end of the tubular section 53 of the housing 52. The nozzle assembly further includes a liner 64, of insulating material, an end cap 65, a throat 66, formed of molybdenum, and an insulating sleeve 67 between the throat and the end cap. The liner 64 is of insulating material and extends between the aft end of the aftmost of a plurality of serially connected liner sections 43a within the longitudinal section 43 of the discharge tube 44 and the insulating sleeve 67.

As best seen in FIG. 2, the nozzle assembly 45 is mounted concentrically within the inlet section 47 at the aft end thereof and at the mouth of a combustor, or afterburner, 69. The combustor 69 is connected to said inlet section and extends substantially throughout the length of the propellant case 14. At its aft end the combustor is canted toward the longitudinal axis of the vehicle and connected with an exhaust nozzle assembly 70.

Figure 11:
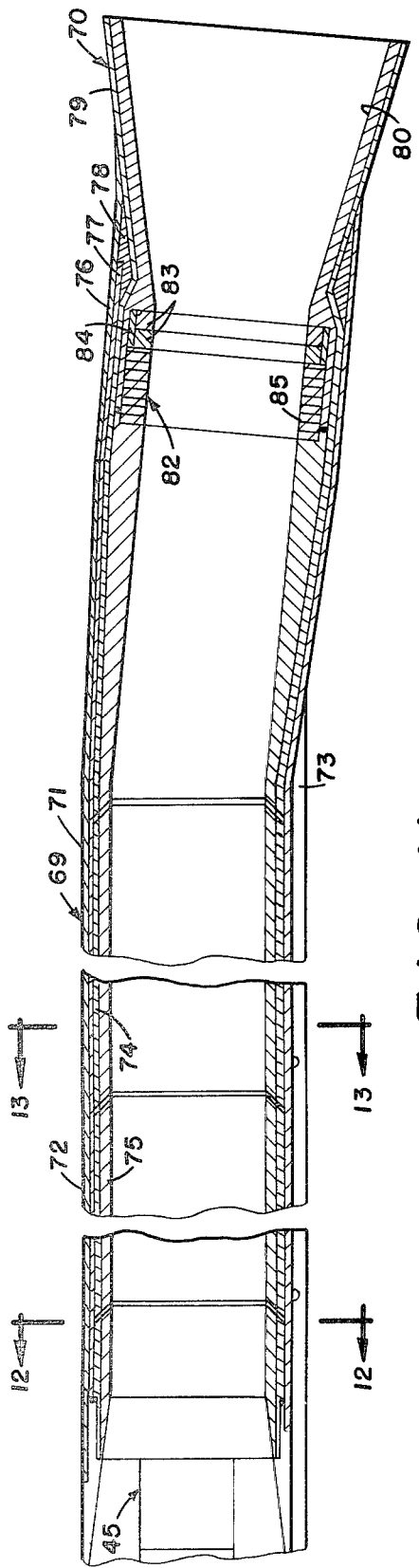
FIG. 11 is an enlarged axial section showing the combustor and exit nozzle structure of one of the ramjet engines.
Figure 13:
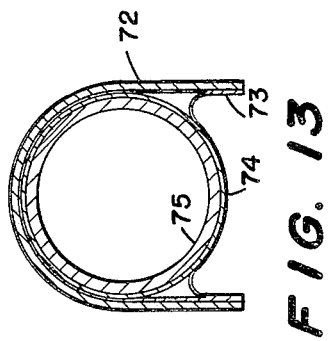
FIG. 13 is a transverse section on the line 13—13 of FIG. 11.
Figure 12:
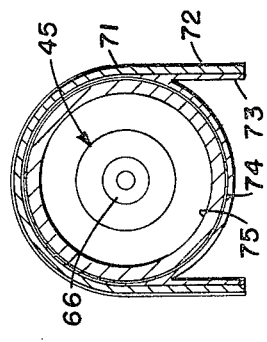
FIG. 12 is a transverse section on the line 12—12 of FIG. 11.
Figure 14:
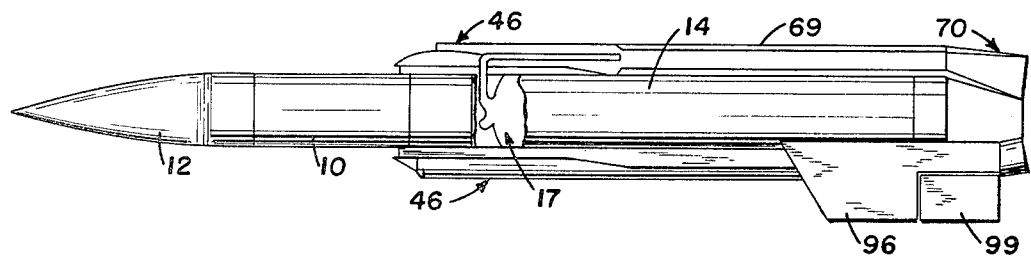
FIG. 14 is a side elevation, on a reduced scale and in part schematic, showing the vehicle of the present invention, portions being broken away or omitted for the sake of clarity.

Referring to FIGS. 11, 12 and 13, the combustor 69 includes a cylindrical case 71 on which is sprayed to a predetermined thickness a layer of insulation 72, such as Dow-Corning 93-072. The case 71 has a skirt 73 which extends to the wall of the propellant case 14 to provide a fairing for the combustor. Within the case 71 is a layer of insulation 74 which may be silica cloth phenolic MX 2600 wrapped with its fabric orientation parallel to the center line of the combustor. Within the insulation layer 74 is a liner 75 which consists of serially arranged sections of insulating material, such as silica cloth phenolic MX 2600 wrapped with its fabric orientation 28°-32° to the combustor center line.

The exhaust nozzle assembly 70 is of conventional conical design with a 12-degree half-angle expansion cone and is connected to the aft end of the combustor, said nozzle assembly being canted toward the vehicle axis at an angle of 5°29′. The nozzle assembly 70 includes an outer layer of insulation 76, which is sprayed on, a steel shell 77, a stainless steel ring 78 connected with shell, an outer nozzle member 79, of longitudinally oriented silica phenolic cloth, and a liner 80 of tape wrapped silica phenolic MX 2600 oriented 20° to the axis of the vehicle. The forward end portion of the liner 80, which forms the throat section of the exhaust nozzle 70, is recessed to receive a throat assembly 82 which comprises relatively thick washers 83 of pyrolytic graphite, a band 84 of carbon or pyrolytic graphite, and a throat element 85 which is formed of stacked, edge-oriented relatively thin silica phenolic washers. As seen particularly in FIG. 11, the exhaust nozzle assembly 70 is connected to the aft end of the combustor 69 with the inner surface of the throat element 85 flush with that of the liner 75 of said combustor.

It should be understood that, to provide the thrust needed for vehicle climb-out, the combined throat area of the four combustors should be made equal to about 40% of the cross-sectional area of the body, i.e., the propellant case 14. As a result little, if any, contraction can be used in the exhaust nozzle assemblies 70. Thus, the nozzles are canted inwardly, as stated hereinabove, to allow the vehicle to fit into the spaced provided on the launcher.

Figure 15:
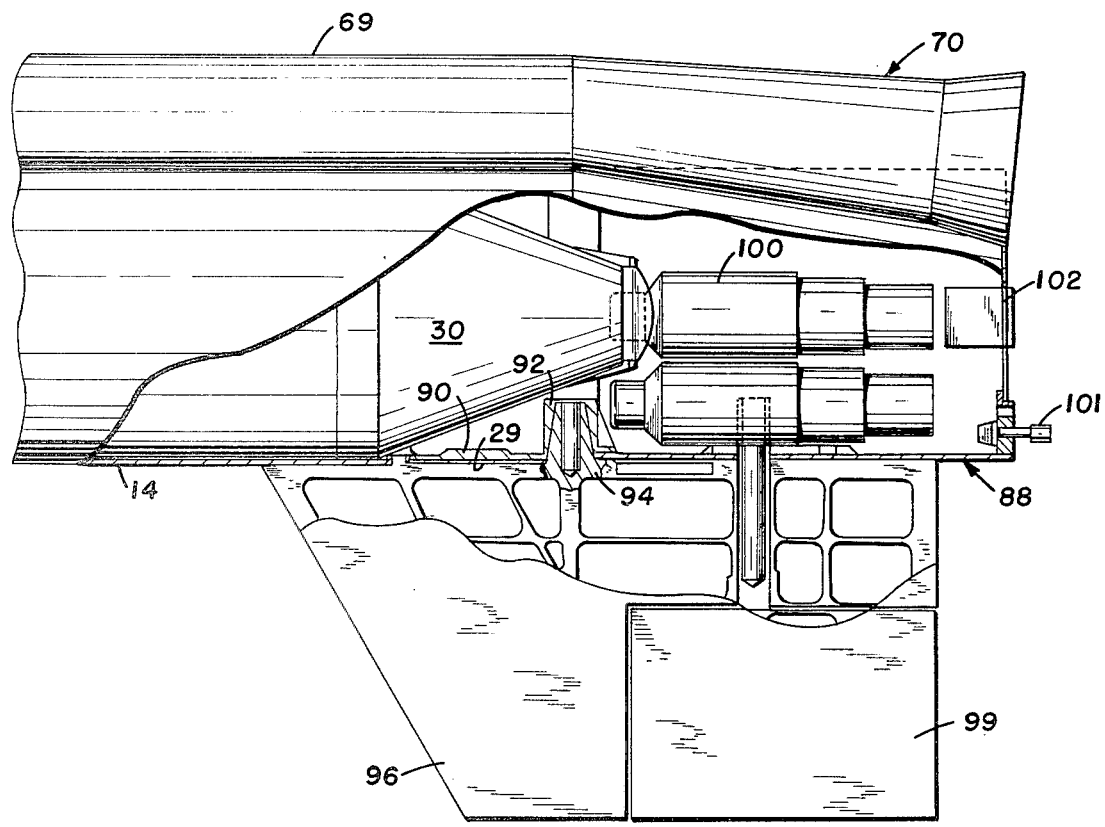
FIG. 15 is an enlarged side elevation, with some portions broken away and others omitted, showing the aft end of the vehicle.
Figure 16:
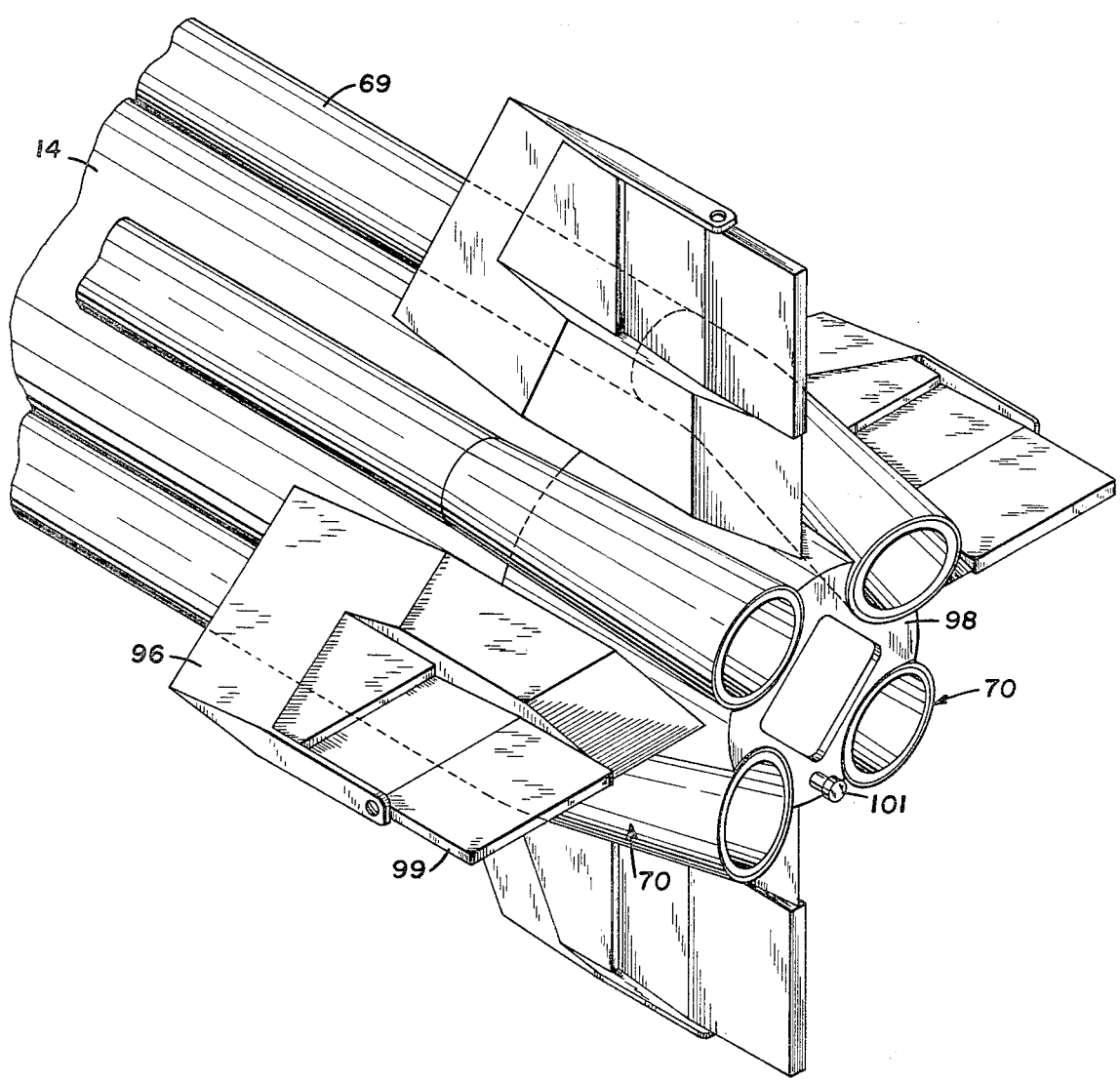
FIG. 16 is a detail perspective showing the aft end of the vehicle.

Referring to FIGS. 15 and 16, the aft body section is shown at 88. The aft body section 88 includes the skirt 29 on the propellant case 14, and a reinforcing frame 90 which includes sockets 92 for receiving the spars 94 of fixed tail fins 96 which, as previously stated, are inter-digitated with the exhaust nozzle assemblies 70. As seen particularly in FIG. 16, the aft body section 88 is formed with grooves 98 which are of semicircular shape and are inclined rearwardly, toward the axis of the vehicle, to receive the canted exhaust nozzle assemblies 70.

The fixed tail fins 96 are each provided with steering sections, or flippers, 99 which are driven by suitable actuators 100 that are carried in the aft body section 88 aft of the conical section 30 of the propellant case 14. To enable a quick reaction time, the fins may be foldable.

To provide connection with a booster (not shown) bolts 101 are mounted in the aft end wall 102 of the body section 88. Release of the vehicle from the booster is effected by activating explosive nuts on the bolts 101.

As will be obvious, some of the details of construction of the vehicle will vary in accordance with changing requirements. Accordingly, it has not been deemed necessary to describe every element of the invention in minute detail. Sufficient description has been provided, it is believed, to enable one skilled in the art to understand the construction and operation of the vehicle.

We claim:

1. An aerial vehicle including means carried by the vehicle which, when ignited, will produce a fuel-rich exhaust, propelling means arranged on the vehicle symmetrically thereabout, means for igniting said first-mentioned means, means for conducting fuel-rich exhaust from said first-mentioned means to said propelling means upon operation of said igniting means, and expandable means connected between said fuel-rich exhaust conducting means and said propelling means to allow for thermal expansion due to said exhaust, said fuel-rich exhaust producing means including a motor having a propellant grain and said propelling means comprising a plurality of air breathing engines, said fuel-rich exhaust mixing with air in said engines and burning to produce thrust.

2. The aerial vehicle recited in claim 1, wherein said fuel-rich exhaust conducting means includes a manifold connected to the motor, and a discharge tube connected between the manifold and each of the engines.

3. An aerial vehicle including a frame having a body and a propellant case, a plurality of engines mounted on the exterior of the frame symmetrically thereabout and each having an inlet section, a motor in the propellant case, an igniter in the propellant case for igniting the motor, said motor upon ignition producing a fuel-rich exhaust, and means for conducting said fuel-rich exhaust to the engines, said fuel-rich exhaust mixing with air entering the inlet sections, the mixture burning in the engines to produce thrust for propelling the vehicle, said fuel-rich exhaust conducting means comprising a manifold having a central chamber and a plurality of outlet pipes, one of said outlet pipes being provided for each said engine, a bellows connected between each of said outlet pipes and said propellant case, a discharge tube connected between each of said engines and one of said outlet pipes, each said discharge tube including a radial section extending through one of said bellows into the inlet section of one of said engines and a longitudinal section extending longitudinally of one of said engines, and a discharge nozzle on each said longitudinal section of said discharge tube.

4. An aerial vehicle as recited in claim 3, wherein each of said engines includes a combustor connected to the inlet section, and an exhaust nozzle assembly, said frame being cylindrical and said exhaust nozzle assembly being canted toward the axis of the frame.

5. An aerial vehicle as recited in claim 4, including additionally an aft section connected to the propellant case and having grooves, tail fins mounted on the aft section and interdigitated with said exhaust nozzle assemblies, said exhaust nozzle assemblies lying in said grooves.

6. An aerial vehicle as recited in claim 5, including steering sections for said tail fins, and actuators in said aft section and connected to said steering sections.

7. An aerial vehicle as recited in claim 3, wherein each is semicircular and comprises inlet section comprising an outer shell, a spike section and an innerbody defining a diffuser, said outer shell and said spike section defining a throat, and wherein said fuel-rich exhaust conducting means includes a discharge tube which extends into the innerbody, said fuel-rich exhaust from said discharge tube mixing with air entering the throat and passing over the diffuser and burning in the engine to produce thrust.

8. An aerial vehicle as recited in claim 3, wherein each of said engines includes a semicircular inlet section, a circular combustor and an exhaust nozzle assembly, a diverter wedge between each said engine and the propellant case, said fuel-rich exhaust conducting means including a discharge tube having a discharge nozzle in the inlet section, fuel-rich exhaust from said discharge nozzle mixing with air entering the inlet section, burning in the combustor and discharging from the exhaust nozzle assembly to produce thrust.

9. An aerial vehicle as recited in claim 3, wherein said radial section of each of said discharge tubes comprises separate inner, central and outer portions and said longitudinal section includes a plurality of serially connected liner sections.

10. An aerial vehicle including a frame, a plurality of engines mounted on the frame and spaced equidistant from each other thereabout and extending longitudinally of the frame, a motor mounted within the frame, an igniter for the motor, said motor upon ignition producing a fuel-rich exhaust, means for conducting said fuel-rich exhaust from the motor to the engines, said exhaust conducting means including an expandable bellows to allow for thermal expansion, and an exhaust nozzle assembly on each of the engines at the aft end thereof, said nozzle assemblies being canted toward a center line passing through the frame longitudinally thereof, said fuel-rich exhaust mixing with air entering the forward ends of the engines and the mixture of said exhaust and air burning in the engines to produce thrust for propelling the vehicle.

11. An aerial vehicle as recited in claim 10, wherein said engine includes an inlet section, a combustor and an exhaust nozzle assembly, and wherein said fuel-rich exhaust conducting means includes a manifold between the motor and the engine and a flow diverter within the manifold.

12. An aerial vehicle as recited in claim 11, wherein said inlet section includes an outer shell, a spike section and an innerbody defining a diffuser, said outer shell and spike section defining a throat, and including means for removing excess air flow entering the engine through the throat.

13. An aerial vehicle as recited in claim 12, wherein said excess air flow removing means comprises a slot between the spike section and the innerbody.

14. The invention recited in claim 11, including additionally a diverter wedge between the engine and the frame.

15. The invention as recited in claim 10, wherein the frame includes a body, a propellant case and an aft body section connected to the propellant case, tail fins mounted on the aft body section, steering sections on the tail fins, and actuators in the aft body section and connected to the steering sections.

* * * * *